(12) United States Patent
Grenabo et al.

(10) Patent No.: US 9,407,388 B2
(45) Date of Patent: Aug. 2, 2016

(54) METHOD AND DEVICE FOR RESIDENT TIME CALCULATION AND SYNCHRONIZATION

(75) Inventors: Hakan Grenabo, Floda (SE); Per-Arne Thorsen, Ojersjo (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 29 days.

(21) Appl. No.: 14/376,431

(22) PCT Filed: Feb. 7, 2012

(86) PCT No.: PCT/EP2012/052032
§ 371 (c)(1),
(2), (4) Date: Aug. 3, 2014

(87) PCT Pub. No.: WO2013/117217
PCT Pub. Date: Aug. 15, 2013

(65) Prior Publication Data
US 2014/0362872 A1    Dec. 11, 2014

(51) Int. Cl.
*H04L 1/00*    (2006.01)
*H04J 3/06*    (2006.01)

(52) U.S. Cl.
CPC ............. *H04J 3/0667* (2013.01); *H04J 3/0638* (2013.01)

(58) Field of Classification Search
CPC ..... H04W 56/00; H04W 56/01; H04W 56/02; H04W 56/03; H04J 3/0638; H04J 3/0639; H04J 3/064; H04J 3/0641; H04J 3/0642
USPC ......... 370/324, 350, 503, 512, 510, 252, 304, 370/349, 389; 709/203, 208
See application file for complete search history.

(56) References Cited

U.S. PATENT DOCUMENTS

2007/0008993 A1    1/2007   Cha et al.
2009/0276542 A1    11/2009  Aweya et al.
2011/0261917 A1*   10/2011  Bedrosian ............. H04J 3/0667
                                                        375/371

OTHER PUBLICATIONS

PCT International Search Report, mailed Oct. 30, 2012, in connection with International Application No. PCT/EP2012/052032, all pages.
Bui, Dinh Thai et al. "Packet delay variation management for a better IEEE 1588V2 performance" 2009 International IEEE Symposium on Precision Clock Synchronization for Measurement, Control and Communication, Brescia, Italy, Oct. 12-16, 2009, pp. 1-6, XP031570876, ISBN: 978-1-4244-4391-8.

* cited by examiner

*Primary Examiner* — Dady Chery
(74) *Attorney, Agent, or Firm* — Leffler Intellectual Property Law, PLLC

(57) ABSTRACT

The embodiments herein relate to a method in a communications network comprising a communications link connecting a first device to a second device. The communications link comprises an upper layer having a variable delay and a lower layer having a constant delay. The first device comprises a first clock and the second device comprises a second clock. The communications network synchronizes the first clock via the lower layer of the communications link with the second clock. The communications network determines, at the second device, a residence time for a first message when transmitted from the first device to the second device via the upper layer of the communications link.

13 Claims, 15 Drawing Sheets

METHOD AND DEVICE FOR RESIDENT TIME CALCULATION AND SYNCHRONIZATION

TECHNICAL FIELD

Embodiments herein relate generally to a first device and a method in the first device, a second device and a method in a second device, a communications network and a method in the communications network.

More particularly the embodiments herein relate to synchronizing clocks and residence time in the communications network.

BACKGROUND

In a typical communications network, a wireless terminal(s) communicates via a Radio Access Network (RAN) to one or more Core Networks (CN). The wireless terminal is also known as mobile station and/or User Equipment (UE), such as mobile telephones, cellular telephones, smart phones, tablet computers and laptops with wireless capability. The user equipments may be, for example, portable, pocket-storable, hand-held, computer-comprised, or vehicle-mounted mobile devices which communicate voice and/or data via the RAN. In the following, the term user equipment is used when referring to the wireless terminal.

The RAN covers a geographical area via cells that each cell is being served by a base station, e.g. a Radio Base Station (RBS), which in some networks is also called NodeB, B node, evolved Node B (eNB) or Base Transceiver Station (BTS). In the following, the term base station is used when referring to any of the above examples. A cell is a logical entity to which has been assigned a set of logical resources such as radio channels that provides radio communication in a geographical area. The base station at a base station site physically realizes the logical cell resources such as transmitting the channels. From a user equipment perspective the network is represented by a number of cells.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. Universal Terrestrial Radio Access Network (UTRAN) is essentially a RAN using WCDMA for user equipments. The Third Generation Partnership Project (3GPP) has undertaken to evolve further the UTRAN and GSM based RAN technologies.

Long Term Evolution (LTE) is a variant of a 3GPP radio access technology wherein the base stations are connected directly to a CN rather than to RNCs. In general, in LTE the functions of a RNC are performed by the base station. As such, the RAN of an LTE system has an essentially "flat" architecture comprising base stations without reporting to RNCs.

Precise timing is important in communications networks. The network time is available when it is represented by a clock. However, not every clock is exact. The deviation of the clock needs to be checked, and the clock needs to be corrected. Communication between a plurality of clocks in the network is necessary for this. To synchronise individual clocks the more inaccurate clock is set to the more accurate one. This may also be called offset correction or error correction. Furthermore, clocks may not necessarily run at exactly the same speed. Therefore, the speed of the more inaccurate clock has to be regulated constantly. This may also be referred to as drift correction.

The Network Time Protocol (NTP) and the Simple Network Time Protocol (SNTP) derived from it are protocols for providing timing in communications networks. NTP and SNTP allow accuracies into the millisecond range.

Another method for synchronization of clocks is the use of radio signals from Global Positioning System (GPS) satellites. However, this requires relatively expensive GPS receivers in every clock as well as the appropriate antennae. This type of clock has high precision.

The Institute of Electrical and Electronics Engineers (IEEE) 1588 is a standard which relates to synchronizing of real-time clocks in the nodes of a networked system. The IEEE 1588 describes a Precision Timing Protocol (PTP) which specifies methods to distribute high accuracy time synchronization in packet networks. PTP provides accuracy in the sub-microsecond range, is easy to implement and involves low cost equipment. PTP is designed to operate in packet based networks that supports multicast communication.

Five different message types are defined for PTP:
Sync
Delay_Req
Follow_Up
Delay_Resp
Management Sync and Delay_Req are also referred to as event messages, because they are used as timing events by the PTP protocol. Sending and receipt time stamps are generated for the sync and Delay_Req messages. The other three messages, Follow_Up, Delay_Resp and Management are also referred to as general messages. Follow_Up and Delay_Resp are used to transmit timing information. No time stamps are generated when the Follow_Up and Delay_Resp messages are sent or received. The different messages will be described in more detail below.

Clocks in a communications network implementing PTP are organized in a master-slave hierarchy. Each slave clock synchronizes to its master clock. In general, a clock comprises at least one port which is an interface for transmitting and receiving e.g. the above mentioned messages.

Within a device in the communications network, ports may be connected to master clocks, slave clocks or they may be Transparent Clocks (TC). A transparent clock is a method specified in IEEE 1588 where the PTP protocol is transparently conveyed through a device by bookkeeping of the residence time. The transparent clock in a PTP network updates the time-interval field that is part of the PTP event message. This update compensates for switch delay and has a resolution of one picosecond. Master clocks transmit announcement messages comprising information on its capabilities. Slave clocks listen to announcements and select a preferred master clock using a "Best Master Selection Algorithm". The slave clock then starts to listen to synchronization messages (Sync) sent by the selected master clock. The term Ordinary Clock (OC) is used to denote a clock that is located at either termination side of the PTP protocol. i.e. both the master clock or slave clock may be referred to as ordinary clocks.

FIG. 1 illustrates an embodiment of timing diagram for synchronization messages in the communications network.

Step 101

The master clock transmits the synchronization message to the slave clock. The master clock time stamps the synchronization messages with its local clock when the message is transmitted, t1.

A time stamp is a sequence of characters, denoting the date and/or time at which a certain event occurred, e.g. transmission of the synchronization message. A time stamp is the time at which an event is recorded by a computer, not the time of the event itself. In many cases, the difference may be inconsequential: the time at which an event is recorded by a time stamp, e.g. entered into a log file, should be very, very close to the time of the occurrence of the event recorded.

This data is usually presented in a consistent format, allowing for easy comparison of two different records and tracking progress over time; the practice of recording time stamps in a consistent manner along with the actual data is called time stamping.

The slave clock receives the synchronization message and records the time of reception of the synchronization message using its local clock, t2.

Step 102

The master clock transmits a Follow_Up message comprising the time stamp t1.

Step 103

In order to be able to perform synchronization, the delay of the connection between the master clock and the slave clock must be known. The slave clock may therefore initiate a delay measurement by transmitting the Delay Request message. The slave clock records the time of transmission of the Delay Request message with its local clock, t3.

The master clock receives the Delay Request message and records the time reception with its local clock, t4.

Step 104

The master clocks then forwards the time of reception, t4, to the slave clock in a Delay Response message.

Using time stamp information collected in the procedure described above, the slave clock may calculate the error or offset between its local clock and the master clock compensated for the connection delay using a simple algebraic equation.

By repeating the above procedure continuously, the slave clock will stay time locked to the master clock. It is also possible to extend this scheme to frequency locking. After initial time synchronization is performed, subsequent time offsets are taken as phase error inputs to a Phase Locked Loop (PLL) controlling the rate at which the slave clock is incrementing.

As long as the connection between the master clock and the slave clock has constant and symmetric delay and rate, very high precision timing distribution may be achieved in the network. With proper hardware support for time stamping, clock distribution accuracy in the nanosecond range is within reach.

As soon as the connection between the slave clock and the master clock is something other than a wire or a fiber, as e.g. a switch, performance is quickly deteriorated due to Packet Delay Variation (PDV) emerging from the varying time, residence time, packets spend in the device. PDV is defined as the difference between the maximum and minimum transport delay for a packet between two relevant reference points in a network.

A communications network may comprise Boundary Clocks (BC). Boundary clocks are often present wherever there is a change of the communication technology, network elements blocking the propagation of the PTP messages or network devices that inserts significant delay fluctuation in the network. A boundary clock may have more than two ports. One of the ports serves as a slave port to an upstream master clock, and the other port serves as master clock to downstream slave clocks. A boundary clock may also be described as a method specified in IEEE 1588 v2 where the PTP protocol is terminated on a slave port in a device and regenerated on one or more master port(s)

The PTP also specifies a Transparent Clock profile for network devices that implements neither a slave clock nor a master clock. Each event message, i.e. messages that are time stamped as e.g. Synchronization messages, also comprises a correction field. A transparent clock simply uses its local clock to keep track of a residence time of a PTP packet in the TC and then accumulates this time to the correction field. The residence time may be defined as the delay incurred by a data packet passing through the device. Every device that receives an event message is then able to subtract the accumulated residence times in the correction field from its local time stamp before performing calculations. By using Transparent Clocking, the impact from PDV, of deterministic origin, is reduced by at least four orders of magnitude even if the network device involved uses modest 100 ppm accuracy clocks.

Microwave transmission refers to the technology of transmitting information or power by the use of radio waves whose wavelengths are conveniently measured in small numbers of centimeters; these are called microwaves. The part of the radio spectrum comprising microwaves ranges across frequencies of 1.0 GHz-300 GHz. Microwave communications is primarily limited to line of sight propagation. A microwave radio link uses a beam of radio waves in the microwave frequency range to transmit e.g. video, audio, or data between two locations. The connection between the two link endpoints is referred to as a channel. A plurality of microwave links may be aggregated to form a composite link in order to reach a higher data capacity than can be attained in the channel bandwidth available to a single link. Design of microwave radio links always aims for efficient use of the radio spectrum. Several techniques are used to accomplish this, especially in systems optimized for packet data transport. Examples are:

- Adaptive Coding and Modulation (ACM) that adjusts error correction overhead and modulation scheme to the current channel conditions.
- Utilization of orthogonal properties of the radio channel like Multiple Input Multiple Output (MIMO) and polarization thus creating multiple channels at the same frequency.
- Compression of headers and payload.
- Application of signal techniques such as diversity reception and channel equalization to counteract adverse channel conditions.
- Aggregation of multiple radio links to a logical traffic channel (bonding) each.

These techniques result in a channel capacity that has both fast and slow variation over time. This in turn leads to a varying and asymmetric PDV that deteriorates time synchronization performance.

ACM mentioned above is a method where coding overhead and modulation scheme automatically adapts to what is currently possible over the provided physical channel.

MIMO is mentioned in the examples above and is a technique to increase throughput by utilization of some orthogonal characteristic of the radio channel. Usually in line of sight Microwave Radio Links, MIMO refers to configurations exploiting spatial orthogonallity.

Further, data processing procedures like fragmentation, error correction coding, scrambling that are commonly applied in the radio interface make it very hard to identify and time stamp the PTP event message at the physical radio interface.

For these reasons, solutions that implement either Boundary Clocks or Transparent Clocks in Microwave Radio Links, or other media converters with similar properties, tend to suffer from either bad accuracy due to high PDV or excessive overhead resulting in inefficient spectrum utilization.

FIG. 2 shows a problem with PDV introduced between a Packet Sub System 201 and—as an example—three Physical Interface blocks 205 with constant delay in a device. Three physical interface blocks 205 are shown as an example in FIG. 2, but any other suitable number of physical interface blocks 205 is applicable. The PDV is introduced due to variable rate on the physical interface and serialization delay. The packet sub system 201 comprises a clock 207, such as an e.g. boundary clock or transparent clock. The packet sub system 201 comprises first and second ports 210. Delay through a Segmentation/Bonding block 215 is not possible to accurately predict since it depends on the momentary rate of the individual physical interfaces 205, and thus finally the radio channel conditions. The physical interface 205 corresponds to a lower layer. The upper layer is over the whole system (not shown in FIG. 2).

FIG. 3 shows a problem with a Transparent Clock acting on segmented data where a time bridge over protocol layers increases complexity and overhead in a device. A packet sub system 301 comprises a clock 307, such as a boundary clock or transparent clock. The packet sub system 301 comprises first and second ports 310. The segmentation/bonding block 315 comprises a transparent clock 320 and a third port 330. Three physical interfaces 305 are connected to the segmentation/bonding block 215. The segment may comprise several packets and since the residence time must be tracked for each packet, a segment may have to comprise several correction fields. Also time stamping has to be performed over protocol layers, i.e. packet⇔segment. This either creates restrictions on how packets may be mapped to segments in order to keep PTP correction fields accessible in the segment interfaces or makes it necessary to add explicit data for time stamps on the segment protocol layer. In both cases complexity and overhead will increase. Excessive overhead adds complexity and diminishes link utilization.

SUMMARY

An object of embodiments herein is therefore to improve performance in a communications network comprising a communication link with constant delay at a lower layer and a variable delay at an upper layer.

According to a first aspect, the object is achieved by a method in a communications network comprising a communications link connecting a first device to a second device. The communications link comprises an upper layer having a variable delay and a lower layer having a constant delay. The first device comprises a first clock and the second device comprises a second clock. The communications network synchronizes the first clock via the lower layer of the communications link with the second clock. The communications network determines, at the second device, a residence time for a message when transmitted from the first device to the second device via the upper layer of the communications link.

According to a second aspect, the object is achieved by a communications network comprising a communications link connecting a first device to a second device. The communications link comprises an upper layer having a variable delay and a lower layer having a constant delay. The first device comprises a first clock and the second device comprises a second clock. The communications network is configured to synchronize the first clock via the lower layer of the communications link with the second clock. The communications network is configured to determine, at the second device, a residence time for a message when transmitted from the first device to the second device via the upper layer of the communications link.

According to a third aspect, the object is achieved by a method in a first device connected to a second device via a communications link in a communications network. The communications link comprises an upper layer having a variable delay and a lower layer having a constant delay. The first device comprises a first clock. The first device synchronizes the first clock via the lower layer of the communications link with a second clock comprised in the second device.

According to a fourth aspect, the object is achieved by a first device connected to a second device via a communications link in a communications network. The communications link comprises an upper layer having a variable delay and a lower layer having a constant delay. The first device comprises a first clock. The first device comprises a processor which is configured to synchronize the first clock via the lower layer of the communications link with a second clock comprised in the second device.

According to a fifth aspect, the object is achieved by a method in a second device connected to a first device via a communications link in a communications network. The communications link comprises an upper layer having a variable delay and a lower layer having a constant delay. The second device comprises a second clock. The second device determines a residence time for a message when transmitted from the first device to the second device via the upper layer of the communications link.

According to a sixth aspect, the object is achieved by a second device connected to a first device via a communications link in a communications network. The communications link comprises an upper layer having a variable delay and a lower layer having a constant delay. The second device comprises a second clock. The second device comprises a processor which is configured to determine a residence time for a first message when transmitted from the first device to the second device via the upper layer of the communications link.

By performing the synchronizing in the lower layer of the communications link, it is possible to compensate for the variable delay when signalling in the upper layer, thus improving performance in the communications network.

Embodiments herein afford many advantages, of which a non-exhaustive list of examples follows:

The embodiments herein compensate for serialization delays, buffering delays, transport delays and signal processing delays over a microwave connection.

Another advantage of the embodiments herein is that a standard PTP functionality is used.

The embodiments herein require extremely precise time accuracy and stability. Thus, the timing precision improves network monitoring accuracy and troubleshooting ability.

In addition to providing time accuracy and synchronization, the PTP message-based protocol may be implemented on packet-based networks, such as Ethernet networks. The benefits of using PTP in an Ethernet network comprise the advantages of low cost and easy setup in existing Ethernet networks, and that very little network bandwidth is needed for PTP data packets.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

The embodiments herein relate to a packet optimized point to point transmission system and to precision timing protocol residence time compensation over microwave radio links. The embodiments herein relates in more detail to synchronizing clocks at a lower layer of the microwave radio link and to establish a residence time bridge stretching over the lower layer of a communications link to be utilized by an upper layer thus allowing the upper layer to operate without special knowledge of the lower layer properties.

Figure 1:
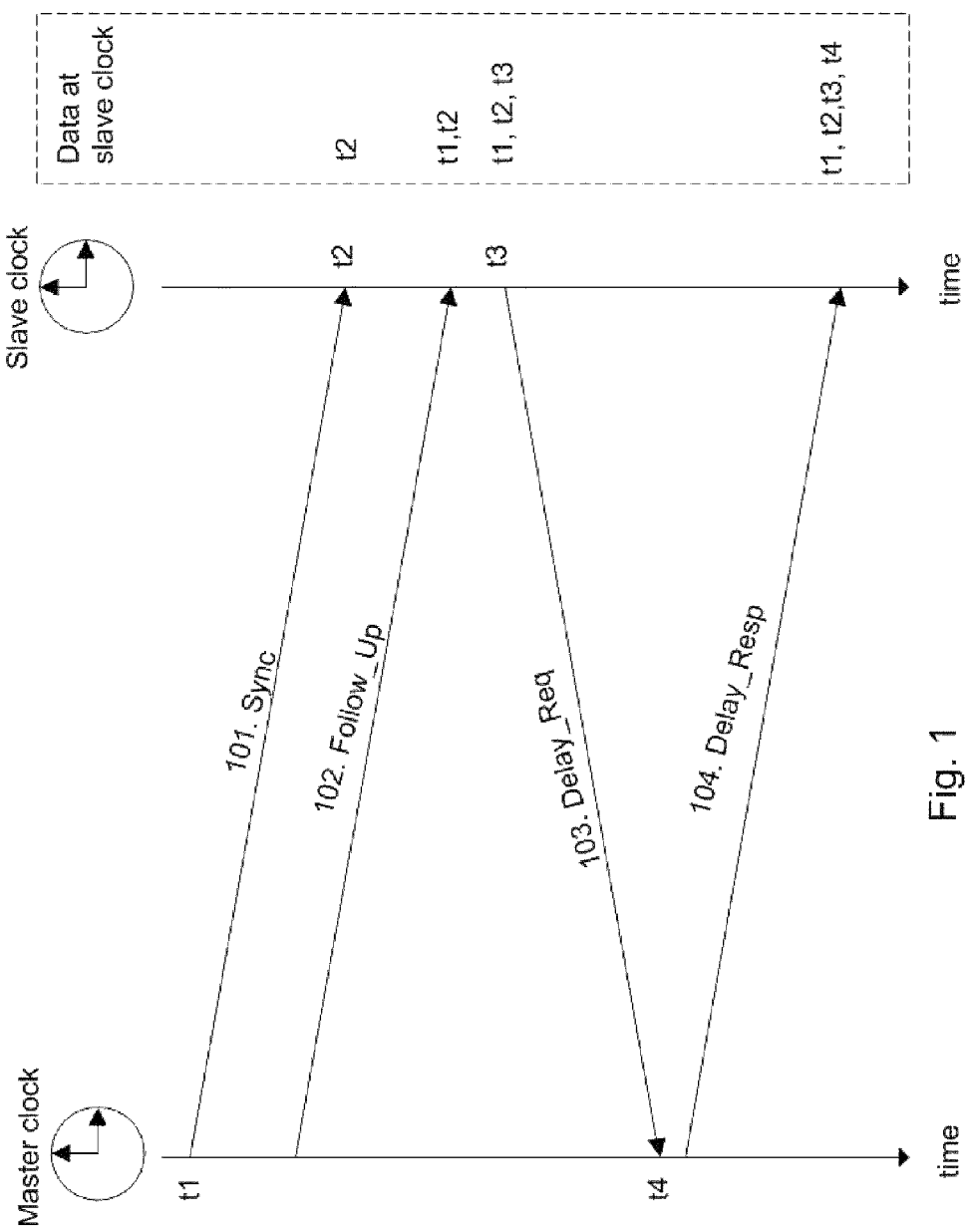
FIG. 1 is a timing diagram illustrating an embodiment for synchronization messages.
Figure 2:
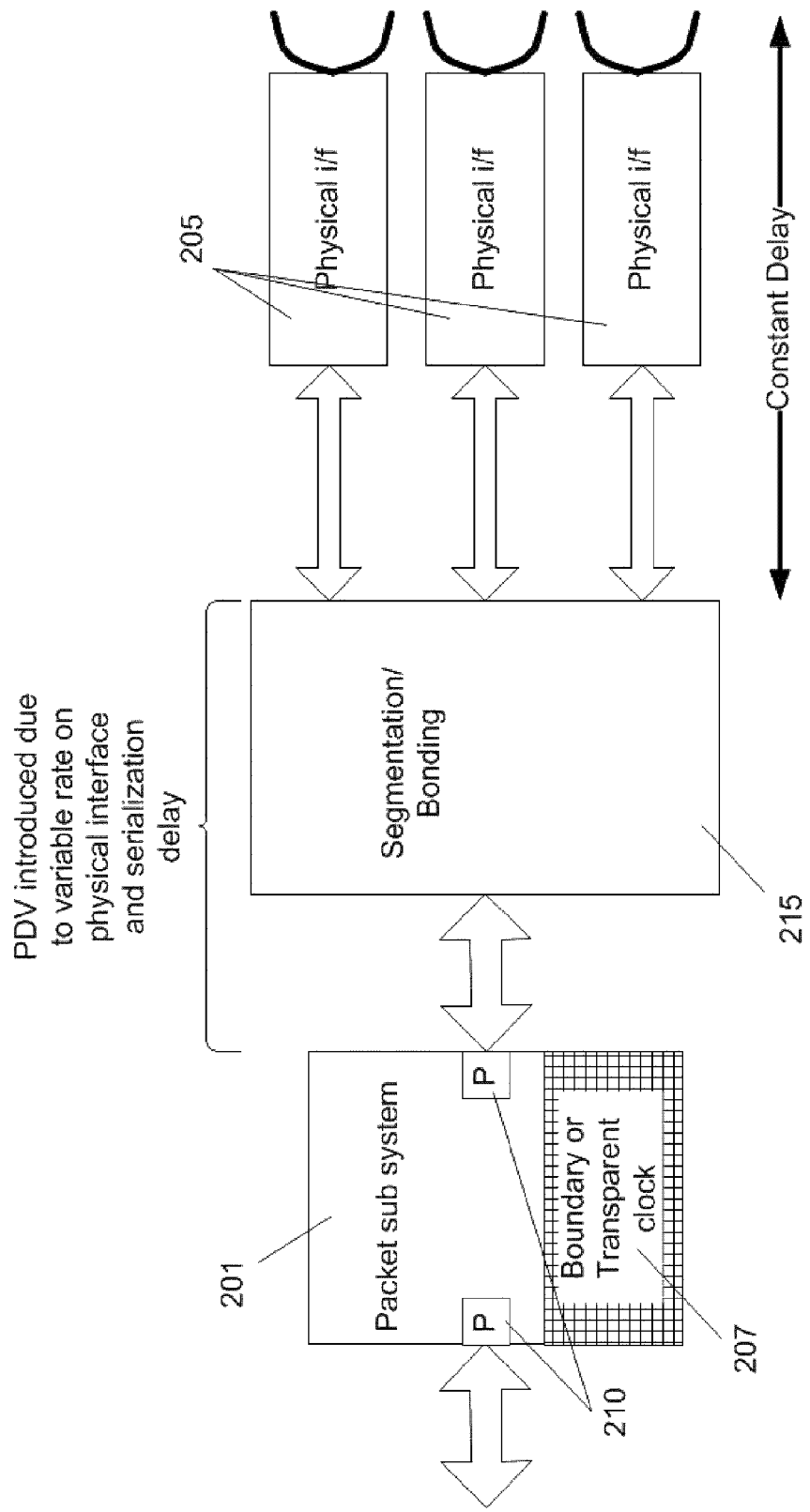
FIG. 2 is a schematic block diagram illustrating embodiments of PDV in segmentation which deteriorates PTP accuracy.
Figure 3:
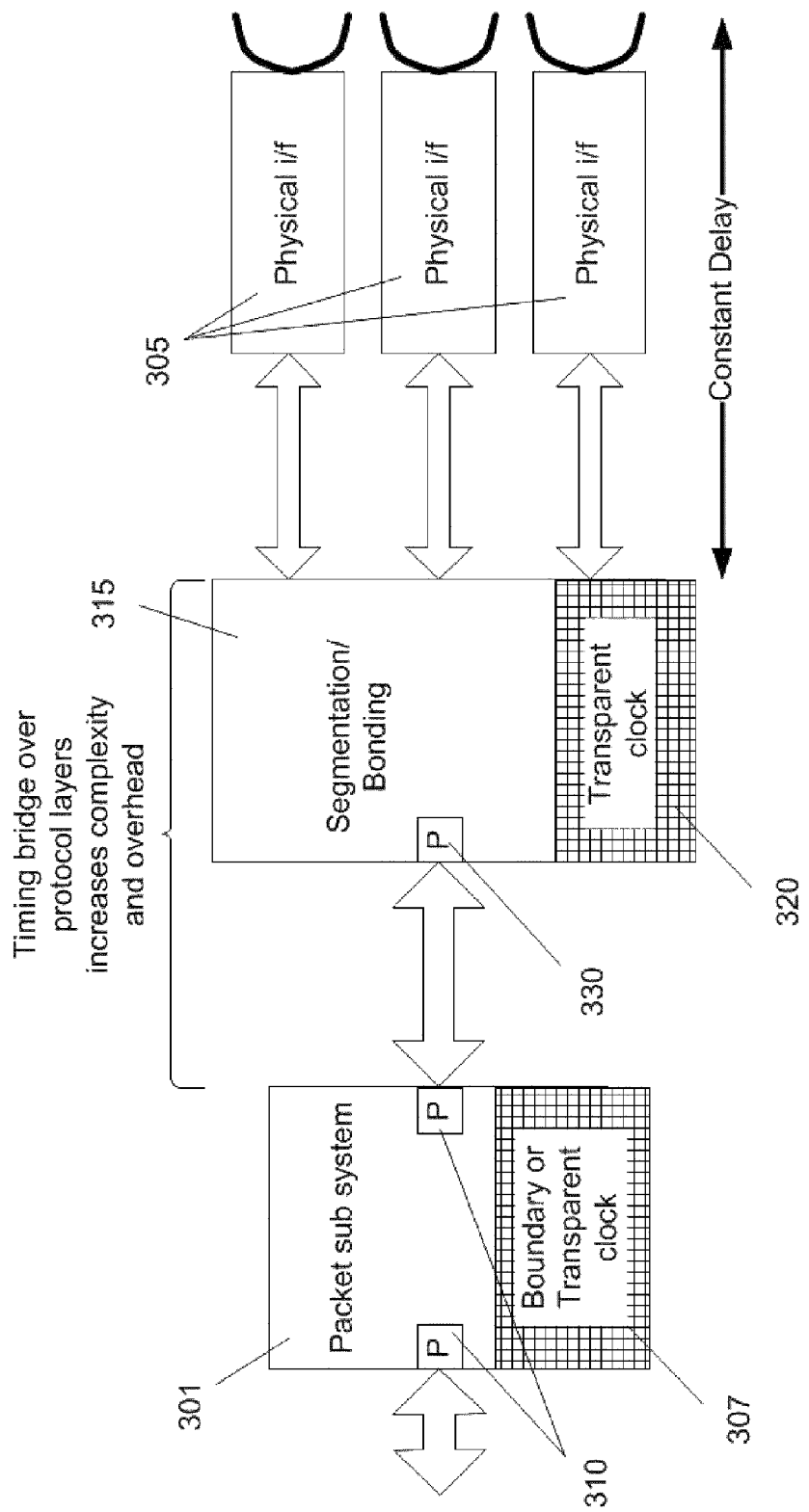
FIG. 3 is a schematic block diagram illustrating embodiments of excessive overhead which adds complexity and diminishes link utilization.
Figure 4A:
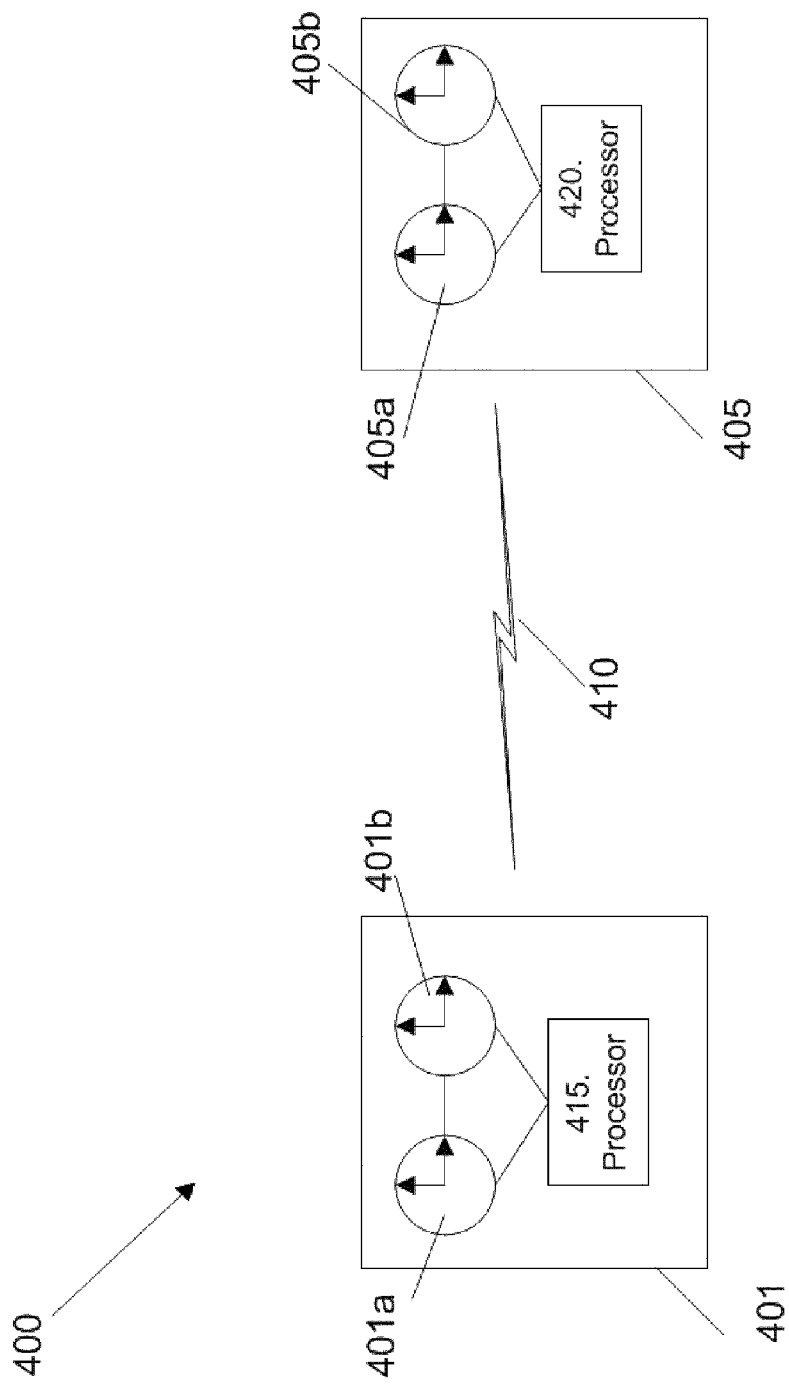
FIG. 4 is a schematic block diagram illustrating embodiments of a communications network.

FIG. 4a depicts a communications network 400 in which embodiments herein may be implemented. The communications network 400 may in some embodiments apply to one or more radio access technologies such as for example Long Term Evolution (LTE), LTE Advanced, Wideband Code Division Multiple Access (WCDMA), Global System for Mobile Communications (GSM), or any other Third Generation Partnership Project (3GPP) radio access technology.

The communications network 400 comprises a first device 401 communicating with a second device 405 over a physical communications link 410. The communications link 410 may also be referred to as the physical media or air interface. The first device 401 may also be referred to as a first Network Element (NE) or a first PTP device, and is for example a switch. In one embodiment, the first device 401 comprises one local clock: a first clock 401a. The second device 405 may also be referred to as a second network element or a second PTP device, and is for example a switch etc. The second device 405 comprises one local clock: a second clock 405a. In another embodiment, the first device 401 comprises two local clocks: a first clock 401a and a third clock 401b. The first device 401 may also be referred to as a first Network Element (NE), and is for example a switch. The second device 405 comprises two local clocks: a second clock 405a and a fourth clock 405b. The second device 405 may also be referred to as a second network element, and is for example a switch etc. The network architecture illustrated in FIG. 4 shows two local clocks in each of the first device 401 and second device 405, but the same figure is used as reference when the each of the first device 401 and second device 405 comprises one clock.

The communications link 410 is a radio link configured to convey data at a variable data rate and with a delay. The communication link 410 comprises an upper layer having a variable delay and a lower layer having a constant delay. The upper layer and the lower layer will be described in more detail with reference to FIG. 4b below.

The communications link 410 may be a microwave radio link etc.

Each of the first device 401 and the second device 405 comprises an ingress port and an egress port (not shown). The communications link 410 provides a data connection between the first device 401 and the second device 405. In the following, the term ingress are used to refer to when a message enters and exits a device. Consequently, the ingress port receives an entering message and the egress ports transmit an exiting message. A message may also enter and exit the different layers of the communications link 410. Each device appends a time stamp to each message as it enters its ingress port and another time stamp to each message as its exits its egress port.

The first device 401 comprises a first processor 415 and the second device 405 comprises a second processor 420. The two processors will be described in more detail below.

Figure 4B:
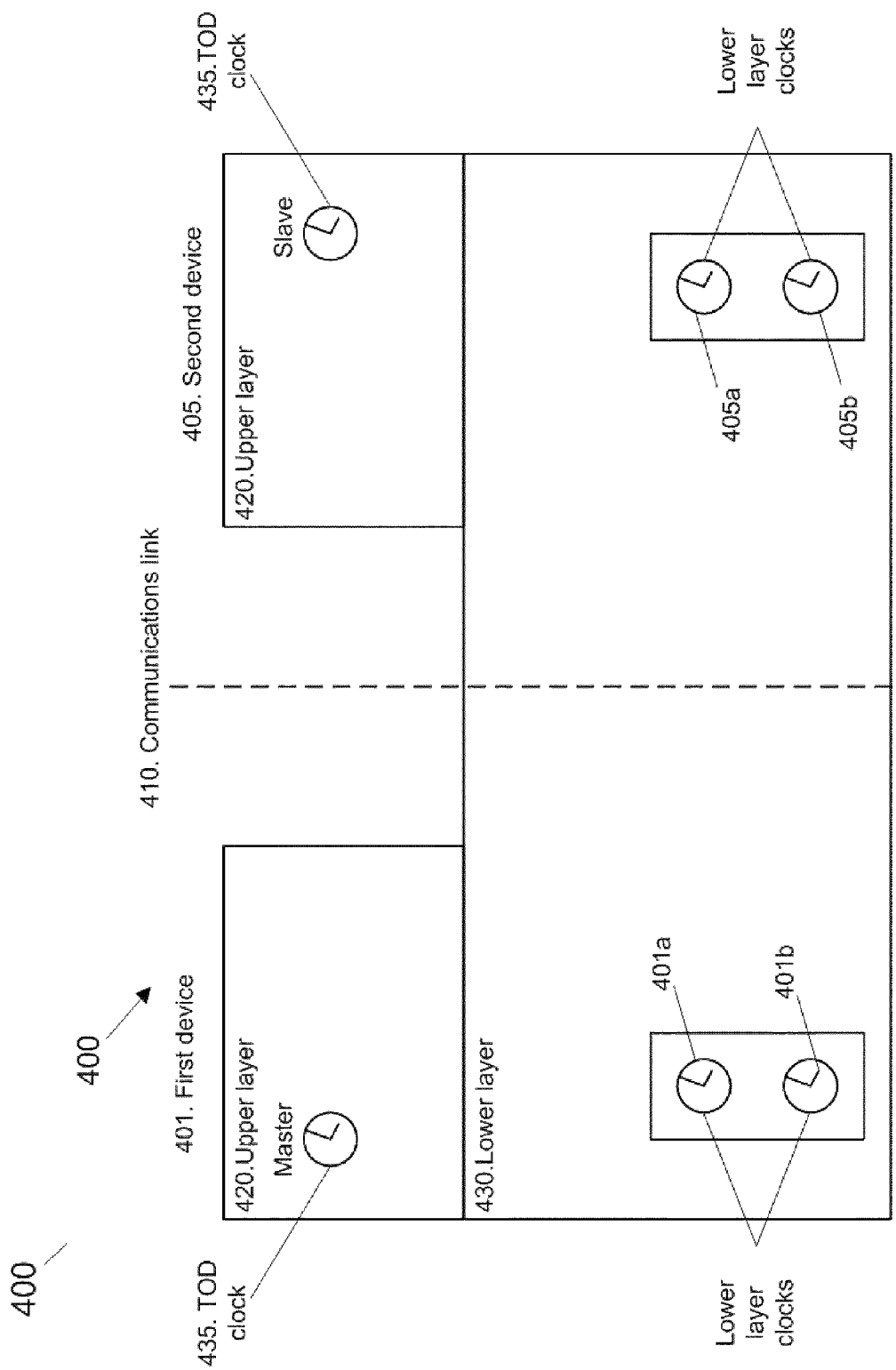

FIG. 4b depicts an embodiment of the communications network 400 and depicting the upper layer 420 and the lower layer 430, in particular. The upper layer 420 in each of the first device 401 and the second device 405 comprises a TOD clock 435. As exemplified in FIG. 4b, the TOD clock 435 in the first device 401 may be a master clock and the TOD clock 435 in the second device 405 may be a slave clock. The TOD clocks 435 in the upper layer 420 may be a boundary clocks or ordinary clocks. The lower layer 420 in each of the first device 401 and the second device 405 comprises one or two clocks, serving as the local clock in a residence time bridge for transparent clocking. For example, the first device 401 comprises a first clock 401a and a third clock 401b and the second device 405 comprises a second clock 405a and a fourth clock 405a. This was also illustrated in FIG. 4a. The clocks in the lower layer 430 are used to determine delay, i.e. a time difference. The clocks in the lower layer 430 do not have to be real-time clocks.

The upper layer 420 is the layer at which the communications network 400 operates, interoperability between network elements is ensured by adherence to standard protocols, an example of which is PTP according to IEEE 1588.

The lower layer 430 is the layer where data is transferred over a link 410 between two adjacent network elements, e.g. the first device 401 and the second device 405, using signaling protocols that are known to both link endpoints, but not known to the network layer. The lower layer 430 thus provides a data transport service to the upper layer 420. By exploiting the properties of the lower layer 430, the internal working of the lower layer 430 is hidden from the upper layer 420. This allows the network protocols at the upper layer 420 to operate according to their respective standards without concern for the particular technology used in the lower layer 430. As the PTP protocol assumes a constant and symmetrical delay from the lower layer 430, the lower layer 430 must then provide a service that makes the upper layer 420 behave correctly even if the actual delay varies in time and/or is asymmetrical.

Figure 5A:
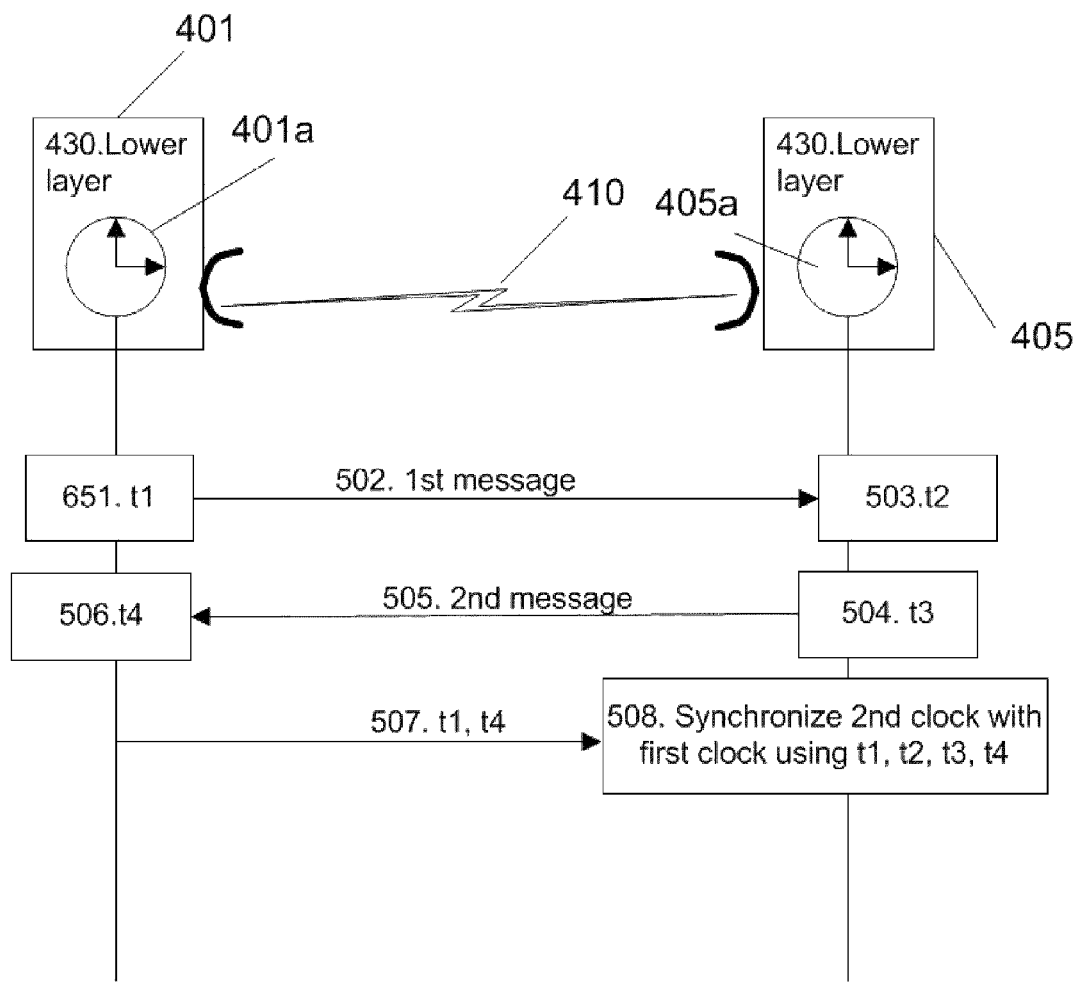
FIG. 5a-5c are combined schematic block diagrams and flowcharts depicting embodiments of a method.
Figure 5B:
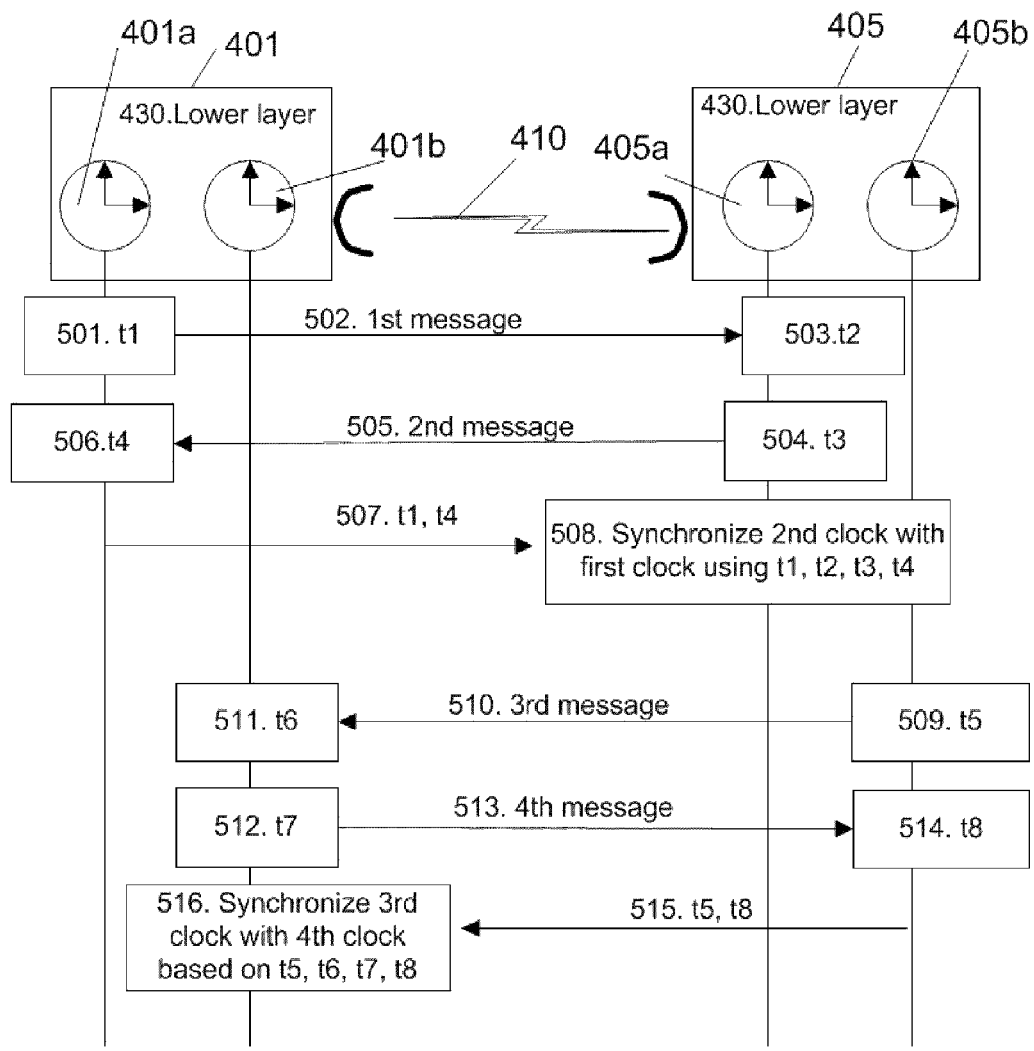
Figure 5C:
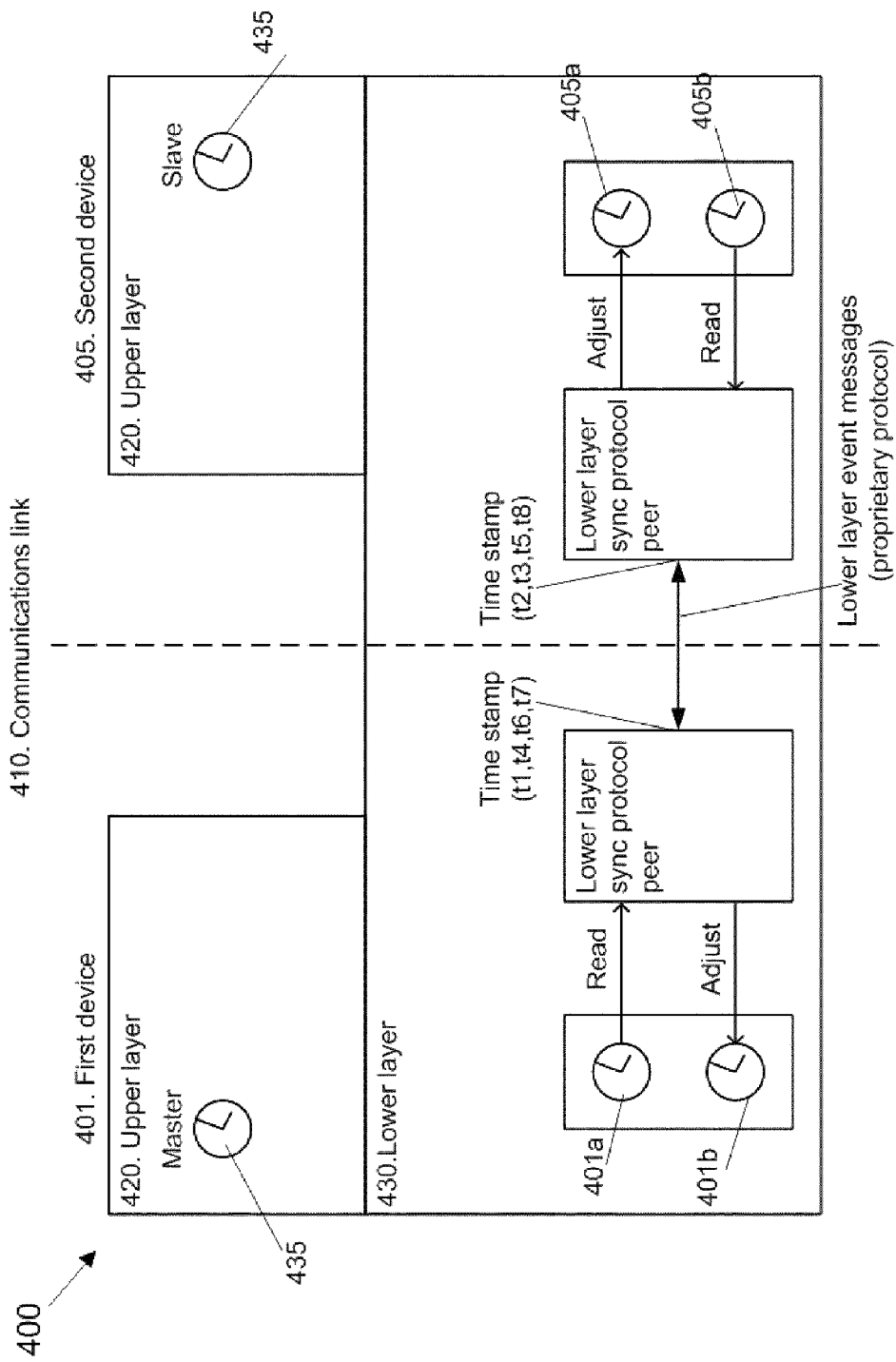

The method for synchronizing clocks via the lower layer 430 of the communication link 410 in the communications network 400, according to some embodiments, will now be described with reference to the combined signaling diagram and flowchart depicted in FIG. 5a, FIG. 5b and FIG. 5c. Note that only the clocks in the lower layer 430 are illustrated in FIGS. 5a-c. FIG. 5a shows the method when each of the first device 401 and the second device 405 comprises one clock. FIG. 5b shows the method when each of the first device 401 and the second device 405 comprises two clocks. FIG. 5c shows the method when each of the first device 401 and the second device 405 comprises two clocks and illustrating in particular that the synchronization is performed on the lower layer 430. The lower layer 430 comprises one instance of a synchronizing protocol in each of the first device 401 and the second device 405. The synchronizing protocol exchanges event messages between the first device 401 and the second device 405. The event messages are transmitted with a constant and symmetric delay between the egress and ingress time stamps in each device. The synchronizing protocol is proprietary, but may be based on the same algorithm such as used by for example IEEE1588. In this way, the clocks in the lower layer 430 in each device can be synchronized. The method comprises the following steps, which steps may as well be carried out in another suitable order than described below:

Step 501

This step is illustrated in FIG. 5a, FIG. 5b and FIG. 5c. The first device 401 determines a first time stamp t1 using the first clock 401a for a transmission of a first message from the first device 401 to the second device 405.

Step 502

This step is illustrated in FIG. 5a, FIG. 5b and FIG. 5c. The first device 401 transmits the first message to the second device 405 with the constant and symmetric delay in the lower layer 430 of the communications link 410. The first message is a lower layer event message based on a proprietary protocol, e.g. IEE1588.

Step 503

This step is illustrated in FIG. 5a, FIG. 5b and FIG. 5c. The second device 405 determines a second time stamp t2 using the second clock 405a. The second time stamp t2 is associated with receipt of the first message at the second device 405.

Step 504

This step is illustrated in FIG. 5a, FIG. 5b and FIG. 5c. The second device 405 determines a fourth time stamp t4 using the second clock 405a for a transmission of a second message from the second device 405 to the first device 401 at the lower layer 430.

Step 505

This step is illustrated in FIG. 5a, FIG. 5b and FIG. 5c. The second device 405 transmits the second message to the first device 401 with the constant and symmetric delay in the lower layer of the communications link 410. The second message is a lower layer event message based on a proprietary protocol, e.g. IEE1588.

Step 506

This step is illustrated in FIG. 5a, FIG. 5b and FIG. 5c. The first device 401 determines, an fourth time stamp t4 using the first clock 401a at the lower layer 430. The fourth time stamp t4 is associated with receipt of the second message at the first device 401.

Step 507

This step is illustrated in FIG. 5a, FIG. 5b and FIG. 5c. The first device 401 transmits the first time stamp t1 and the fourth time stamp t4 to the second device 405. This transmission may be done using control signaling. The second device 405 now has information about four time stamps: t1, t2, t3 and t4.

Step 508

This step is illustrated in FIG. 5a, FIG. 5b and FIG. 5c. The second device 405 synchronizes the second clock 405a to the first clock 401a in the first device 401 using the first time stamp t1, the second time stamp t2, the third time stamp t3 and the fourth time stamp t4.

Step 509

This step is illustrated in FIG. 5b and FIG. 5c. When the first device 401 and the second device 405 each comprises two clocks, the second device 405 determines a fifth time stamp t5 using the fourth clock 405b for a transmission of a third message to the first device 401 using the lower layer 430.

Step 510

This step is illustrated in FIG. 5b and FIG. 5c. When the first device 401 and the second device 405 each comprises two clocks, the second device 405 transmits the third message to the first device 401 with the constant and symmetric delay in the lower layer 430 of the communications link 410. The third message is a lower layer event message based on a proprietary protocol, e.g. IEE1588.

Step 511

This step is illustrated in FIG. 5b and FIG. 5c. When the first device 401 and the second device 405 each comprises two clocks, the first device 401 determines a sixth time stamp t6 using the third clock 401b. The sixth time stamp t6 is associated with receipt of the third message at the first device 401.

Step 512

This step is illustrated in FIG. 5b and FIG. 5c. When the first device 401 and the second device 405 each comprises two clocks, the first device 401 determines a seventh time stamp t7 using the third clock 401b for a transmission of a fourth message to the second device 405 over the lower layer 430.

Step 513

This step is illustrated in FIG. 5b and FIG. 5c. When the first device 401 and the second device 405 each comprises two clocks, the first device 401 transmits the fourth message to the second device 405 with the constant and symmetric delay in the lower layer 430 of the communications link 410. The fourth message is a lower layer event message based on a proprietary protocol, e.g. IEE1588.

Step 514

This step is illustrated in FIG. 5b and FIG. 5c. When the first device 401 and the second device 405 each comprises two clocks, the second device 405 determines an eighth time stamp t8 using the fourth clock 405b. The eighth time stamp t8 is associated with receipt of the fourth message at the second device 405.

Step 515

This step is illustrated in FIG. 5b and FIG. 5c. When the first device 401 and the second device 405 each comprise two clocks, the second device 405 transmits the fifth time stamp t5 and the eighth time stamp t8 to the first device 401. This transmission may be done using control signaling.

Step 516

This step is illustrated in FIG. 5b and FIG. 5c. When the first device 401 and the second device 405 each comprises two clocks, the first device 401 synchronizes the third clock 401b with the fourth clock 405b using the fifth ninth stamp t5, the sixth time stamp t6, the seventh time stamp t7 and the eighth time stamp t8.

Steps 501-508 describe synchronization of the second clock 405a to the first clock 401a at the lower layer 430. However, the steps are also valid for synchronizing the first clock 401a with the second clock 405a at the lower layer 430. Steps 509-516 describe synchronization of the third clock 401b with the fourth clock 405b at the lower layer 430. However, the steps are also valid for synchronizing the fourth clock 405b with the third clock 401b at the lower layer 430.

Note that the synchronization at the lower layer 430 may be initiated in any suitable order.

When the clocks in the lower layer 430 are synchronized over the lower layer 430, as described above, the residence bridge may be established.

Figure 6A:
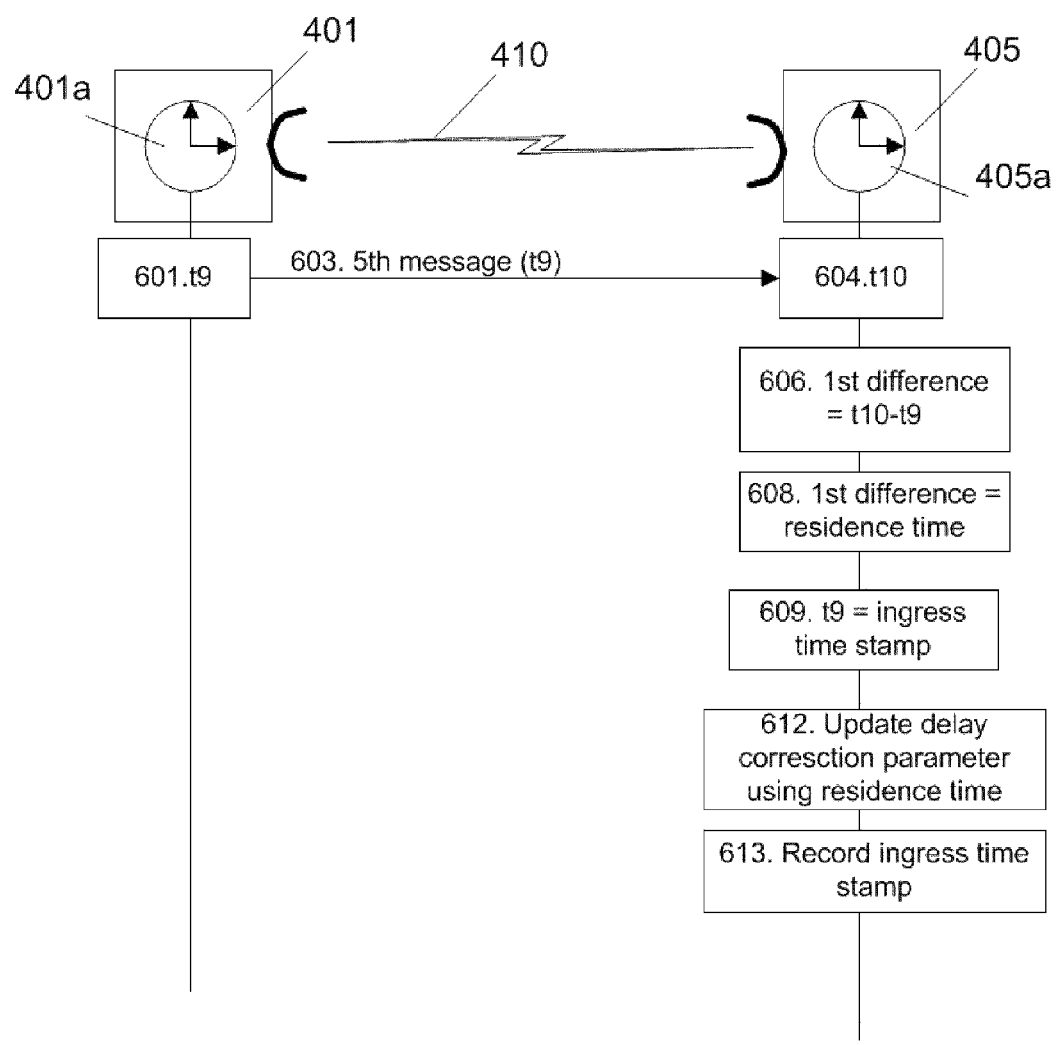
FIG. 6a-d are combined schematic block diagrams and flowcharts depicting embodiments of a method.
Figure 6B:
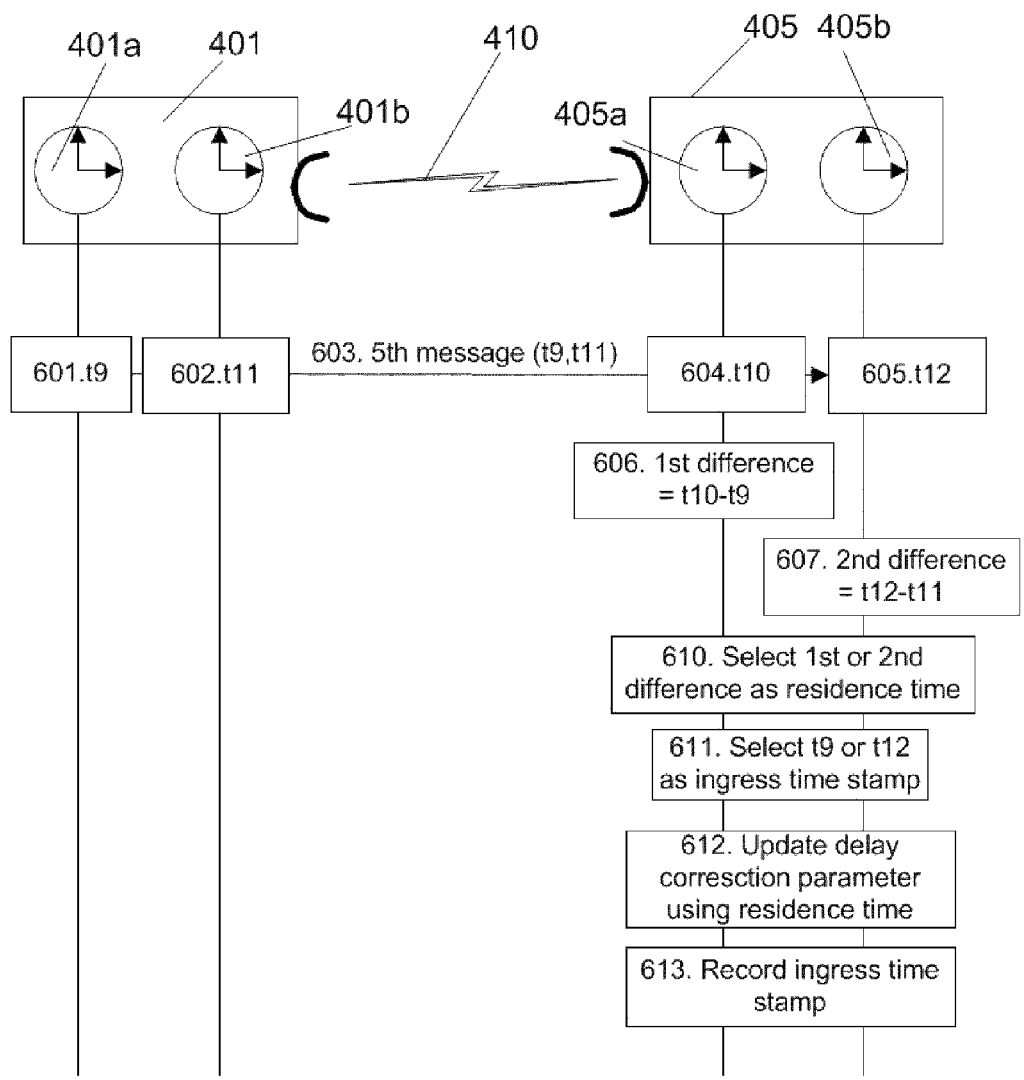
Figure 6C:
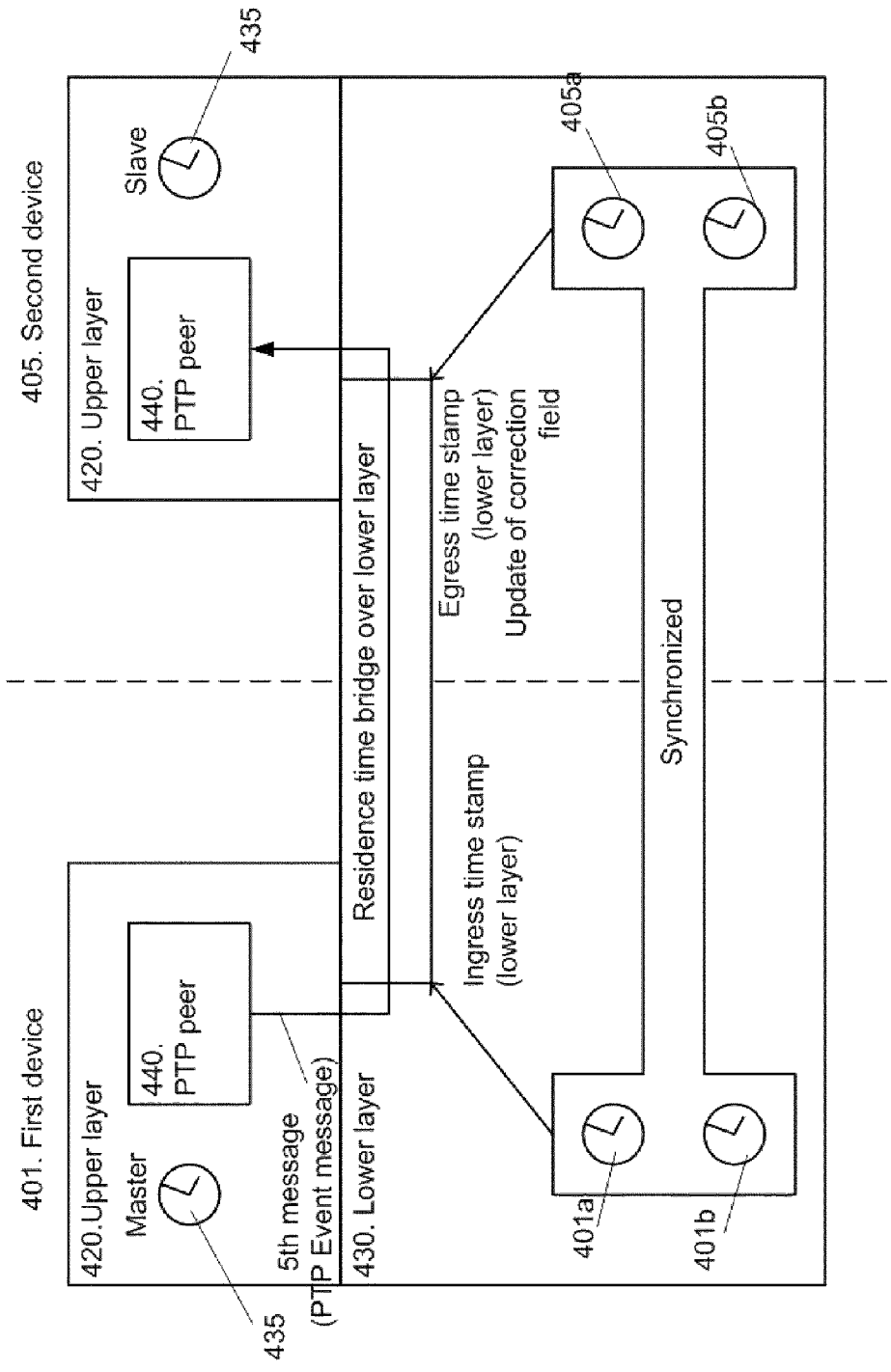

The method for establishing the residence time bridge over the lower layer 430 by utilizing the upper layer 420 of the communications link 410 in the communications network 400, according to some embodiments, will now be described with reference to the combined signaling diagram and flowchart depicted in FIG. 6a, FIG. 6b and FIG. 6c. FIGS. 6a-c may also be seen as a transparent clock over the lower layer 430. FIG. 6a shows the method when each of the first device 401 and the second device 405 comprises one clock. FIG. 6b shows the method when each of the first device 401 and the second device 405 comprises two clocks. FIG. 6c shows the method when each of the first device 401 and the second device 405 comprises two clocks and illustrating in particular which layer of the communications link 401 is used. As mentioned above, the upper layer 420 has a variable delay and the lower layer 430 has a constant and symmetric delay. FIG. 6c illustrates that the upper layer in the first device 401 and the second device 405 comprises a PTP peer device 440 which is configured to transmit and receive PTP event messages, e.g. the fifth message as described above, via the lower layer 430.

The method comprises the following steps, which steps may as well be carried out in another suitable order than described below:

Step 601

This step is illustrated in FIG. 6a, FIG. 6b and FIG. 6c. The first device 401 determines, a ninth time stamp t9 at the ingress from the upper layer 420 using the first clock 401a at for the transmission of a fifth message from the first device 401 to the second device 405.

Step 602

This step is illustrated in FIG. 6b and FIG. 6c. When the first device 401 comprises two clocks, the first device 401 determines an eleventh time stamp, t11, at the ingress from the upper layer 420 using the third clock 401b for the transmission of the fifth message from the first device 401 to the second device 405.

Step 603

This step is illustrated in FIG. 6a, FIG. 6b and FIG. 6c. The first device transmits the fifth message comprising the ninth time stamp t9 to the second device 405 via the upper layer 420 of the communications link 10. As mentioned above, the upper layer 420 has a variable delay. In some embodiments, the fifth message further comprises the eleventh time stamp t11. The fifth message may be a PTP event message.

Step 604

This step is illustrated in FIGS. 6a, 6b and 6c. The second device 405 determines a tenth time stamp t10 at the egress to the upper layer 420 using the second clock 405a. The tenth time stamp t10 is associated with receipt of the fifth message at the second device 405.

Step 605

This step is illustrated in FIGS. 6b and 6c. When the second device 405 comprises two clocks, the second device 405 determines a twelfth time stamp t12 at the egress to the upper layer 420 using the fourth clock 405b. The twelfth time stamp t12 is associated with the receipt of the fifth message at the second device 405. The second device 405 now has information about four time stamps t9, t10, t11 and t12.

Step 606

This step is illustrated in FIGS. 6a, 6b and 6c. The second device 405 determines a first difference between the tenth time stamp t10 and the ninth time stamp t9:

$$\epsilon1=t10-t9.$$

Step 607

This step is illustrated in FIGS. 6b and 6c. When the first device 401 and the second device 405 each comprise two clocks, the second device 405 determines a second difference between the twelfth time stamp t12 and the eleventh time stamp t11:

$$\epsilon2=t12-t11$$

Step 608

This step is illustrated in FIGS. 6a and 6c. When the first device 401 and the second device 405 each comprise one clock, the second device 405 selects the first difference 1 as the residence time.

Step 609

This step is illustrated in FIGS. 6a and 6b. When the first device 401 and the second device 405 each comprise one clock, the second device 405 selects the first time stamp t1 as an ingress time stamp associated with the fifth message in the communications link 410.

Step 610

This step is illustrated in FIGS. 6b and 6c, and is a step performed instead of step 608. When the first device 401 and the second device 405 each comprise two clocks, the second device 405 selects the first difference 1 or the second difference 2 as the residence time based on a clock quality criterion.

Step 611

This step is illustrated in FIG. 6b, and is a step performed after step 610 and instead of step 609. When the first device 401 and the second device 405 each comprise two clocks, the second device 405 selects the ninth time stamp t9 or the twelfth time stamp t12 as an ingress time stamp associated with the fifth message in the communications link 410 based on the clock quality criterion.

Step 612

This step is illustrated in FIG. 6a, FIG. 6b and FIG. 6c. In some embodiments, this step is performed instead of step 613 or in addition to step 612. The second device 405 updates a delay correction parameter in the first message using the residence time. The residence time is the one selected in either step 608 or step 610.

Step 613

This step is illustrated in FIG. 6a, FIG. 6b and FIG. 6c. In some embodiments, this step is performed instead of step 612 or in addition to step 612. The second device 405 records the ingress time stamp. Ingress time stamp may be stored in a computer readable memory comprised in the second device 405. The ingress time stamp is the one selected in either step 609 or step 611.

Note that the message at the upper layer 420 may be handled at the same time and they may be transmitted at the same time in both directions.

The time stamps on the upper layer are used to keep track of the residence time of messages conveyed over this layer. The time stamps on the lower layer relate to clock synchronization only.

Figure 6D:
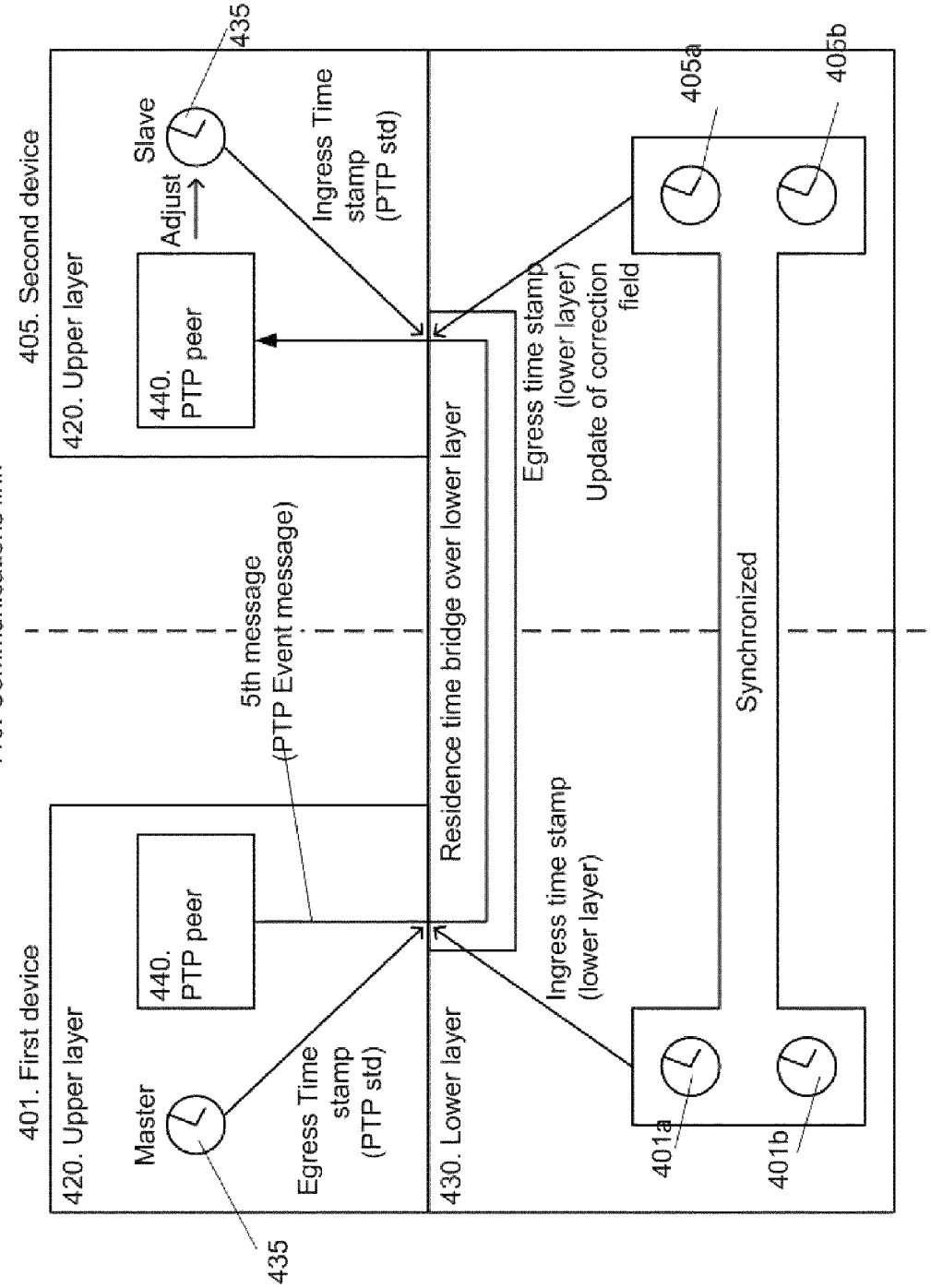

FIG. 6d illustrates an embodiment of the communications network 400 for upper layer synchronization and having a transparent clock in the lower layer 430. As mentioned above, the upper layer 420 comprises a PTP peer device 440 in each of the first device 401 and the second device 405. The PTP peer deivces 440 sends and receives PTP event messages via the lower layer 430. In the first device, at the egress from the upper layer 420, the message is time stamped with an egress time which is added to the message. A the same time, i.e. within the same clock cycle, an ingress time stamp is noted at the lower layer 430. In the second device, i.e. the receiver of the message, an egress time stamp is noted at the lower layer. The correction field is updated as the same time as an ingress time stamp is noted at the upper layer 420. Both time stamps from the upper layer 420 are used by the PTP peer devices 440 to determine the error or offset at the TOD clock 435 at the second clock 405, denoted slave in FIG. 6d, relative to the TOD clock 435 at the first device 401, denoted master in FIG. 6d. Based on this, the TOD clock 435 in the second device 405 is adjusted and synchronized with the TOD clock in the first device 401.

Figure 7:
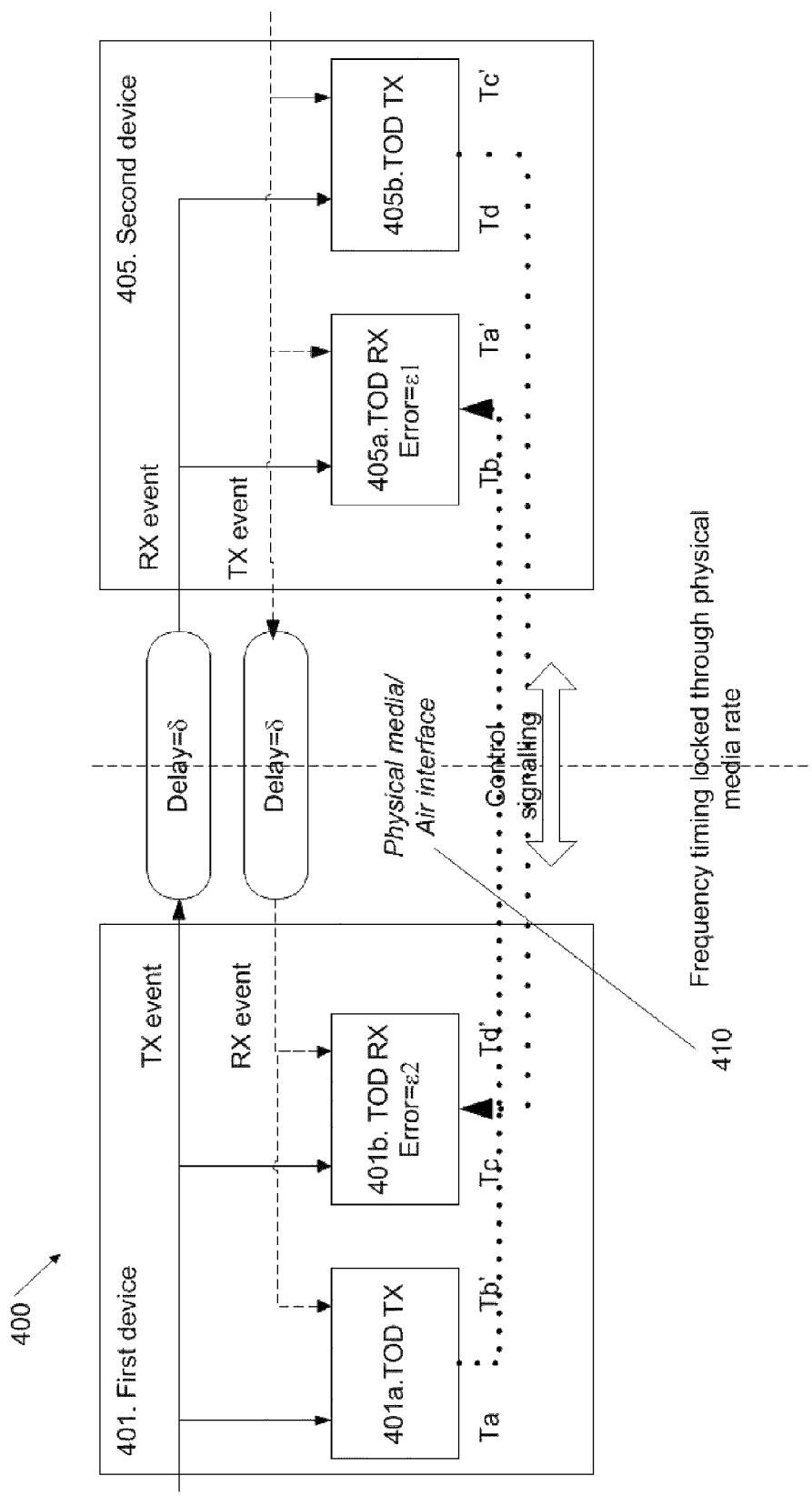
FIG. 7 is a block diagram illustrating embodiments of a communications network.

FIG. 7 is a schematic block diagram illustrating another embodiment of the communications network 400, in particular for synchronization of clocks. The first device 401 and the second device 405 are connected over the communications link 410 and each device comprises two clocks, TOD Tx and TOD Rx. Tx is an abbreviation for transmission and Rx is an abbreviation for receipt. The TOD Tx is locked to a locally available frequency reference e.g. a packet subsystem equipment clock, this frequency is also conveyed over the communications link 410. TOD Rx is locked is in its turn locked to this frequency recovered from the communications link 410, but initially at an unknown error $\epsilon$ from the other device's TOD Tx. The error $\epsilon$ may also be referred to as an offset.

Each device initiates a Tx event, e.g. steps 602, 605, 610 and 613 shown in FIGS. 6a and 6b. This may be done asynchronously between the first device 401 and the second device 405. The Tx events results an Rx event in the other device after a certain delay $\delta$. Both clocks in both devices have the capability to time stamp Rx events and Tx events and exchange these time stamps over a control channel.

With reference to FIG. 7, the following relations are valid;

$$Tb = Ta + \delta + \epsilon 1$$

$$Tb' = Ta' + \delta - \epsilon 1 \qquad \text{Equation 1}$$

$$Td' = Tc' + \delta + \epsilon 2$$

$$Td = Tc' + \delta - \epsilon 2 \qquad \text{Equation 2}$$

where
- Tb is the time stamp for the Rx event at TOD RX 405a at the second device 405,
- Ta is the time stamp for the TX event at TOD TX 401a at the first device 401,
- Tc is the time stamp for the TX event at TOD RX 401b at the first device 401,
- Td is the time stamp for the TX event at the TOD TX 405b at the second device 405,
- Ta' is the time stamp for the RX event at TOD RX 405a at the second device 405,
- Tb' is the time stamp for the RX event at TOD TX 401a at the first device 401,
- Tc' is the time stamp for the Tx event at the TOD Rx 401b at the first device 401,
- Td' is the time stamp for the Tx event at the TOD TX 405b at the second device 405,
- $\delta$ is the delay,
- $\epsilon 1$ is the error for the second device 405,
- $\epsilon 2$ is the error for the first device 401.

Solving the error $\epsilon$ from these equations renders;

$$\varepsilon 1 = \frac{(Tb - Tb') - (Ta - Ta')}{2} \qquad \text{Equation 3}$$

$$\varepsilon 2 = \frac{(Td' - Td) - (Tc' - Tc)}{2}$$

The calculated errors $\epsilon 1$, $\epsilon 2$ may then be used to adjust each device's TOD Rx to be aligned to the other device's TOD Tx.

An extension of the method is averaging over several measurements in order to improve the accuracy and resolution.

After an initial synchronization it is also possible to continuously repeat the procedure for monitoring purposes.

Wide Area Network (WAN) Egress Time Stamping

When the TOD Tx has been replicated to TOD Rx between the devices, each IEEE-1588 PTP event message is time stamped on the WAN egress port. These time stamps are conveyed together with the event messages through the physical layer processing functions and over the communications link 410. There are several ways to do this. Time stamps may e.g. be attached as Type-Length Values (TLV) to Ethernet packets, transported in a separate packet referencing to the concerned package or transported over a dedicated control channel. TLV is a generic format for optional information attached to packets. The important thing is that the time stamp is available when the event message arrives at the WAN ingress in the corresponding device.

Time stamps may be taken from the TOD Rx or the TOD Tx or both. If both are used, a selection mechanism in the corresponding device may chose the clock currently running from the most accurate frequency.

WAN Ingress Lower Layer Residence Time Calculation

After segment reordering and reassembly on the receiving side, event messages will generate a time stamp on the WAN ingress port.

The residence time is then calculated as the difference between this time stamp and the far end egress time stamp. As mentioned in the previous paragraphs, TOD Rx or TOD Tx may be used for time stamps as long as the residence time calculation is performed from clocks that have been synchronized over the communications link 410.

Finally the calculated residence time is added to the correction field of the event packet.

As mentioned above, each device maintains a Time of Day Equipment clock in its Packet Subsystem as part of the PTP function. In the case of a PTP BC, this clock is locked to a Master Clock somewhere in the network and keeps an absolute time with a resolution and epoch specified in the IEEE-1588 PTP specification.

In case of a Transparent Clock, the epoch and resolution of this clock may be different from the full 1588 specification since it is only required to be unambiguous over the maximum residence time of the packet subsystem and provide a resolution good enough to update the 1588 correction field. Neither needs it to contain a representation of the true Time Of Day.

In addition to the TOD equipment clock, the innovation requires a second TOD clock that instantiates a replica of the far end TOD equipment clock.

Now assume that the physical interface provides some event signal that is carried with a constant delay over the communications link. This may e.g. be a framing signal propagated internally at the link Baud rate and over the air at the propagation speed of microwaves. We denote the event signal generated at the transmitter "Tx event" and the resulting event signal at the far end receiver "Rx event". From the discussion it is obvious the delay, δ between a Tx event and the corresponding Rx event is constant. For a connection over a symmetric media between near and far end, as in a Line of Sight Microwave Radio connection, this delay may also be assumed equal in both directions. Selective fading conditions may introduce temporary delay asymmetry, but since that is a non-persistent condition with a limited magnitude it represents less of a restriction to the method. Either the synchronization procedure may be postponed during the duration of such a condition or the magnitude may be included as a contributor to inaccuracy.

Figure 8:
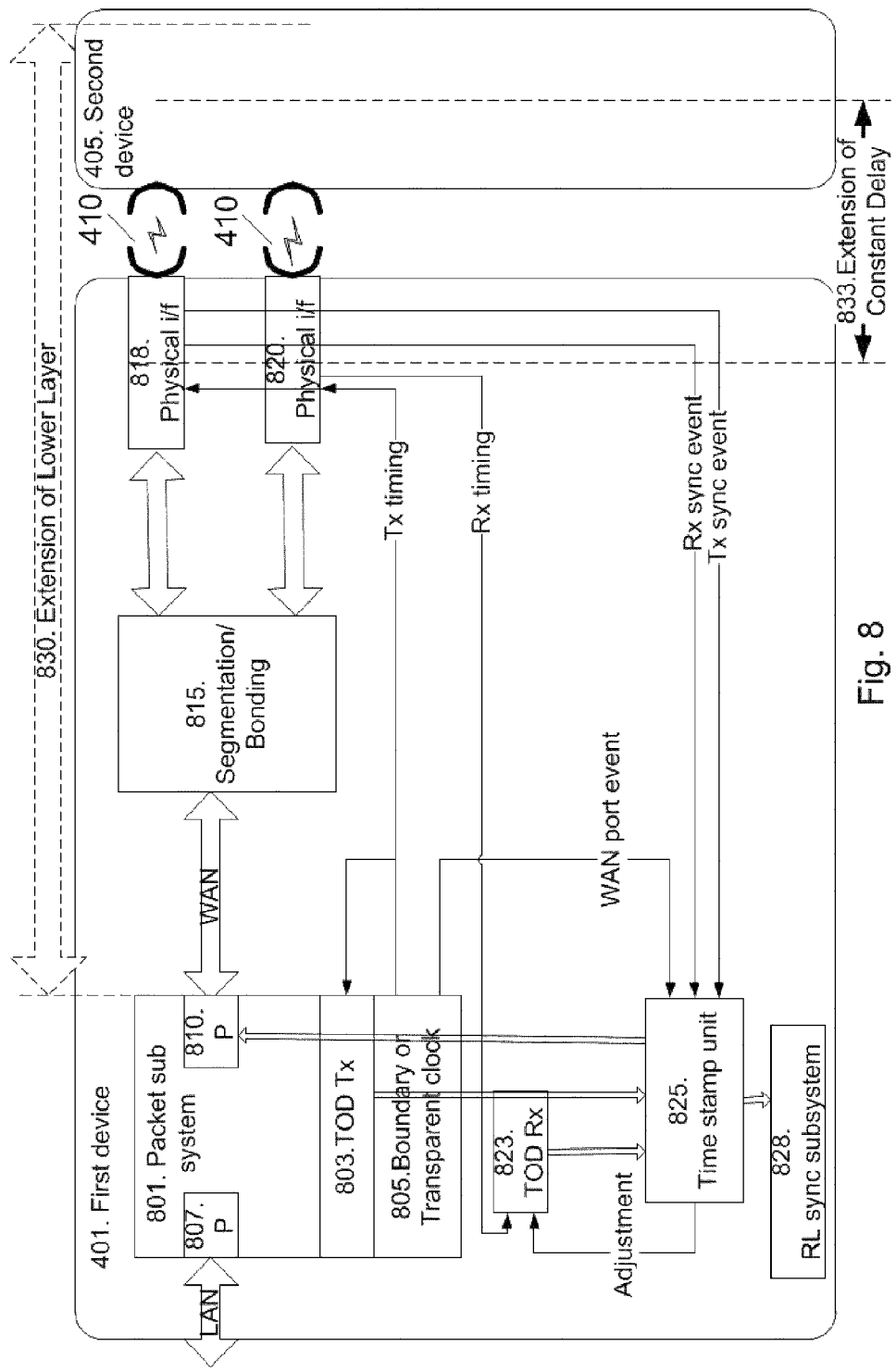
FIG. 8 is a block diagram illustrating embodiments of a communications network.

FIG. 8 is a schematic block diagram illustrating another embodiment of the communications network 400 comprising the first device 401 connected to the second device 405 over the communications link 410. The first device 401 and the second device 405 are identical and symmetrical devices. For the sake of simplicity, the composition of only one of the two devices are illustrated, i.e. first device 401. The second device 405 is illustrated as an empty box, but it the same components as shown in the first device 401 are also comprised in the second device 405.

The first device 401 comprises a packet sub system 801 comprising a local TOD TX clock 803 and a boundary or transparent clock 805. The boundary or transparent clock 805 may be according to IEEE1588, and the packet sub system 801 implements the PTP functionality with the boundary or transparent clock 805. The TOD Tx clock 803 corresponds to the first clock 401 illustrated in FIG. 4, and is a part of the PTP functionality. The Tx means that the frequency is associated with the frequency for the lower layer in the Tx, i.e. transmission, direction. It may be used for time stamping in both directions. The packet sub system 801 comprises a Local Area Network (LAN) ingress port 807 and a Wide Area Network (WAN) egress port 810. The terms egress and ingress refer to the direction in or out of the packet sub system 801.

The packet sub system 801 is connected to a segmentation/bonding block 815 which rearranges packet data to a format suitable for transport over the communications link 410. This rearranging may comprise segmentation and physical link bonding of the packet data. The segmentation/bonding block 815 is connected to a first physical interface 818 and a second physical interface 820 which adapt the signal to the communications link 410. The first physical interface 818 and the second physical interface 820 may be radio transceivers. The first physical interface 818 and the second physical interface 820 provides an identifiable event signal that propagates from the first device 401 to the second device 405 with a constant, symmetric delay over the communications link 410. This may e.g. be in the form of a low level framing signal. Information rate timing is conveyed over the communications link 410 and recovered in the receive direction. This could e.g. be in the form of symbol timing over the physical interface.

In addition to the TOD Tx clock 803 in the packet sub system 801, the first device 401 further comprises a TOD Rx clock 823. The TOD RX clock 823 corresponds to the third clock 401b shown in FIG. 4.

Furthermore, the first device 401 comprises a time stamping unit 825 configured to time stamp received and transmitted sync events and other messages.

The first device 401 also comprises a RL sync subsystem 828. The RL sync subsystem 828 uses the time stamps to synchronize the clocks over the upper layer. In other words, it makes sure that the time stamps are available for both devices, calculates the error and adjusts the TOD_RX.

The dotted arrow above the first device 401 illustrates an extension of the lower layer 830. The extension of the lower layer 830 goes from the WAN port of the first device 401 to the WAN port of the second device 405. The dotted line going through the first physical interface 818 and the second physical interface 820 illustrates an extension of the constant delay 833 of the communications link 410. A corresponding dotted line goes through the physical interface (not shown) of the second devices 405.

Furthermore, the first device 401 and the second device 405 may each comprise a memory (not shown), radio circuitry (not shown), and at least one antenna. The radio circuitry may comprise RF circuitry and baseband processing circuitry. In particular embodiments, some or all of the functionality described above as being provided by the first device 401 and the second device 405 may be provided by the processors executing instructions stored on a computer-readable medium, such as the memory. Alternative embodiments of the first device 401 and second device 405 may comprise additional components beyond those shown in FIG. 8 that may be responsible for providing certain aspects of the first device 401 and the second devices 405 functionality, including any of the functionality described above and/or any functionality necessary to support the embodiments described above.

The residence time bridge is established by, firstly, using the constant delay and frequency synchronization characteristics to replicate the local Time Of Day equipment clock to the far end thus creating a common, symmetrical, conception of time. Secondly, in addition to ordinary PTP processing, for each event packet leaving the WAN egress port attach a local equipment clock time stamp. This could be done e.g. in the form of a TLV added to an Ethernet packet. Thirdly, before ordinary PTP processing takes place, for each event packet entering the WAN ingress port detach the attached time stamp and with the help of the local replica of the far end Time of Day Equipment Clock calculate the residence time for the event packet over the extension of the lower layer. And fourthly, also before ordinary PTP processing takes place, adding the calculated residence time to the PTP correction field.

Figure 9:
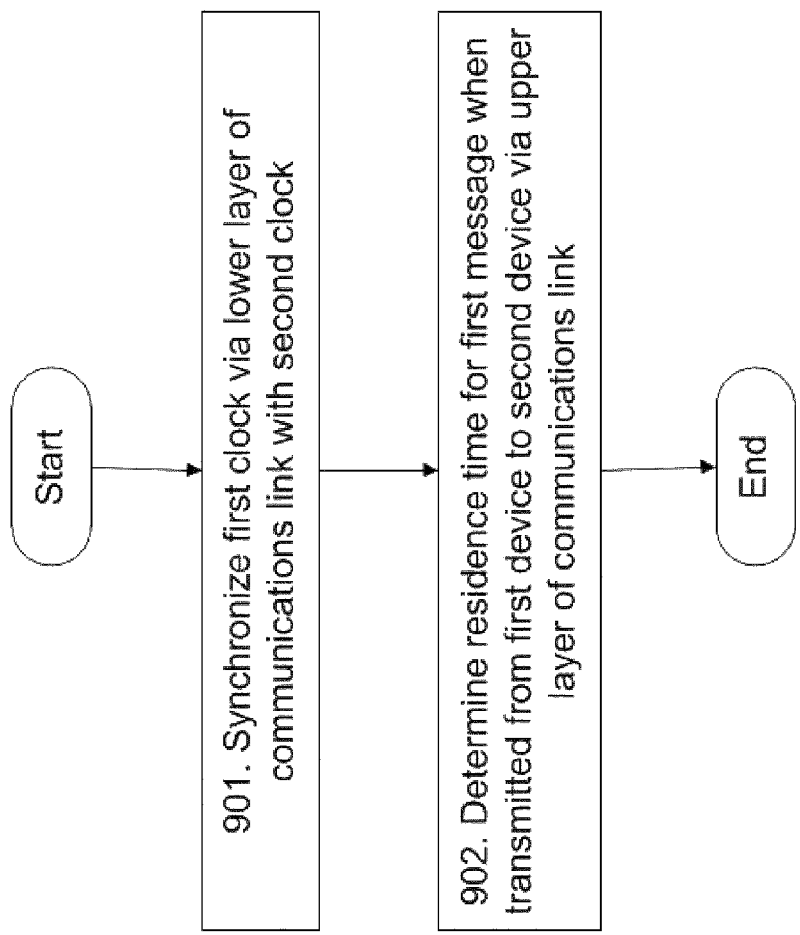
FIG. 9 is a flow chart illustrating embodiments of a method in a communications network.

The method described above will now be described seen from the perspective of the communications network 400. FIG. 9 is a flowchart describing the present method in the communications network 400. As mentioned above, the communications network 400 comprises a communications link 410 connecting the first device 401 to the second device 405. The communications link 410 comprises an upper layer having a variable delay and a lower layer having a constant delay. The first device 401 comprises the first clock 401a and the second device 405 comprises the second clock 405a. The method comprises the further steps to be performed by the communications network 400:

Step 901

The communications network 400 synchronizes the first clock 401a via the lower layer 430 of the communications link 410 with the second clock 405a. The details of the synchronization are previously described in relation to FIGS. 6a and 6b.

Step 902

The communications network 400, determines, at the second device 405, a residence time for a first message when transmitted from the first device 401 to the second device 405 via the upper layer 420 of the communications link 410. The details of the determination of the residence time are previously described in relation to FIGS. 5a and 5b.

To perform the method steps shown in FIG. 9 the communications network 400 comprises an arrangement as shown in FIGS. 4, 7 and 8 as described above.

The present mechanism may be implemented through one or more processors, such as the processor 415 in the first device 401 and the processor 420 in the second device 405, together with computer program code for performing the functions of the embodiments herein. The processor may be for example a Digital Signal Processor (DSP), Application Specific Integrated Circuit (ASIC) processor, Field-programmable gate array (FPGA) processor or micro processor. The program code mentioned above may also be provided as a computer program product, for instance in the form of a data carrier carrying computer program code for performing the embodiments herein when being loaded into the first device 401 and/or second device 405. One such carrier may be in the form of a CD ROM disc. It is however feasible with other data carriers such as a memory stick. The computer program code may furthermore be provided as pure program code on a server and downloaded to the first device 401 and/or second device 405.

The embodiments herein are not limited to the above described preferred embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasized that the steps of the methods defined in the appended claims may, without departing from the embodiments herein, be performed in another order than the order in which they appear in the claims.

The invention claimed is:

1. A method in a communications network comprising a communications link connecting a first device to a second device, wherein the communications link comprises an upper layer having a variable delay and a lower layer having a constant delay, wherein the first device comprises a first clock and the second device comprises a second clock, the method comprising:

synchronizing the first clock via the lower layer of the communications link with the second clock; and determining, at the second device, a residence time for a fifth message when transmitted from the first device to the second device via the upper layer of the communications link, wherein the first device further comprises a third clock and the second device comprises a fourth clock, wherein the third clock is a replica of the fourth clock, and wherein the determining, at the second device, the residence time for the fifth message when transmitted from the first device to the second device via the upper layer of the communications link further comprises:

determining at the first device, an eleventh time stamp using the third clock for the transmission of the fifth message from the first device to the second device;

determining, at the second device, a twelfth time stamp using the fourth clock, which twelfth time stamp is associated with the receipt of the fifth message at the second device; and determining, at the second device, a second difference between the twelfth time stamp and the eleventh time stamp; and wherein the fifth message further comprises the eleventh time stamp.

2. The method according to claim 1, wherein the determining, at the second device, the residence time for the fifth message when transmitted from the first device to the second device via the upper layer of the communications link further comprises:

determining, at the first device, a ninth time stamp using the first clock for the transmission of the fifth message from the first device to the second device;

transmitting the fifth message comprising the ninth time stamp from the first device to the second device via the upper layer of the communications link;

determining, at the second device, a tenth time stamp using the second clock, which tenth time stamp is associated with receipt of the fifth message at the second device; and determining, at the second device, a first difference between the tenth time stamp and the ninth time stamp.

3. The method according to claim 2, further comprising:

selecting at the second device, the first difference as the residence time; and selecting at the second device, the ninth time stamp as an ingress time stamp associated with the fifth message in the communications link.

4. The method according to claim 1, wherein the first device further comprises a third clock and the second device comprises a fourth clock, and wherein the method further comprises:

synchronizing the third clock via the lower layer of the communications link with the fourth clock.

5. The method according to claim 1, wherein the communications link is a microwave radio link.

6. A communications network comprising:

a communications link connecting a first device to a second device, wherein the communications link comprises an upper layer having a variable delay and a lower layer having a constant delay, wherein the first device comprises a first clock and the second device comprises a second clock, wherein the communications network is configured to synchronize the first clock via the lower layer of the communications link with the second clock; and wherein the communications network is configured to determine, at the second device, a residence time for a fifth message when transmitted from the first device to the second device via the upper layer of the communications link, wherein the first device further comprises a third clock and the second device comprises a fourth clock, wherein the third clock is a replica of the fourth clock, wherein the first device is further configured to determine an eleventh time stamp using the third clock for the transmission of the fifth message from the first device to the second device; and wherein the second device is further configured to:
    determine a twelfth time stamp using the fourth clock, which twelfth time stamp is associated with the receipt of the fifth message at the second device; and to
    determine a second difference between the twelfth time stamp and the eleventh time stamp; and
wherein the fifth message further comprises the eleventh time stamp.

7. The communications network according to claim 6, wherein the first device is further configured to:
    determine, a ninth time stamp using the first clock for the transmission of the fifth message from the first device to the second device; and to
    transmit the fifth message comprising the ninth time stamp from the first device to the second device via the upper layer of the communications link; and
wherein the second device is further configured to:
    determine a tenth time stamp using the second clock, which tenth time stamp is associated with receipt of the fifth message at the second device; and to
    determine a first difference between the tenth time stamp and the ninth time stamp.

8. The communications network according to claim 7, wherein the second device is further configured to:
    select the first difference as the residence time; and to
    select the ninth time stamp as an ingress time stamp associated with the fifth message in the communications link.

9. The communications network according to claim 6, wherein the first device is further configured to synchronize the third clock via the lower layer of the communications link with the fourth clock.

10. The communications network according to claim 6, wherein the communications link is a microwave radio link.

11. A method in a second device connected to a first device via a communications link in a communications network, wherein the communications link comprises an upper layer having a variable delay and a lower layer having a constant delay, wherein the second device comprises a second clock, the method comprising:
    determining a residence time for a fifth message when transmitted from the first device to the second device via the upper layer of the communications link,
    wherein the first device further comprises a third clock and the second device comprises a fourth clock, wherein the third clock is a replica of the fourth clock, and wherein the method further comprises:
        determining a twelfth time stamp using the fourth clock, which twelfth time stamp is associated with the receipt of the fifth message at the second device; and
        determining a second difference between the twelfth time stamp and an eleventh time stamp; and
    wherein the fifth message further comprises the eleventh time stamp.

12. The method according to claim 11, further comprising:
    receiving a fifth message comprising a ninth time stamp from the first device via the upper layer of the communications link, which ninth time stamp is associated with transmission of the fifth message from the first device;
    determining a tenth time stamp using the second clock, which tenth time stamp is associated with receipt of the fifth message at the second device; and
    determining, at the second device, a first difference between the tenth time stamp and the ninth time stamp.

13. A method in a second device connected to a first device via a communications link in a communications network, wherein the communications link comprises an upper layer having a variable delay and a lower layer having a constant delay, wherein the second device comprises a second clock, the method comprising:
    determining a residence time for a fifth message when transmitted from the first device to the second device via the upper layer of the communications link;
    receiving a first message from the first device with the constant delay in the lower layer of the communications link;
    determining a second time stamp using the second clock, which second time stamp is associated with receipt of the first message at the second device;
    determining a third time stamp using the second clock for a transmission of a second message from the second device to the first device;
    transmitting the second message to the first device with the constant delay in the lower layer of the communications link;
    receiving a first time stamp and a fourth time stamp from the first device, which first time stamp is associated with transmission of a first message from the first device and which fourth time stamp is associated with receipt of the second message at the first device;
    synchronizing the second clock in the second device to the first clock in the first device using the first time stamp, the second time stamp, the third time stamp and the fourth time stamp;
    determining a fifth time stamp using the fourth clock for a transmission of a third message from the second device to the first device;
    transmitting the third message to the first device with the constant delay in the lower layer of the communications link;
    receiving a fourth message from the first device with the constant delay in the lower layer of the communications link;
    determining an eighth time stamp using the fourth clock, which eighth time stamp is associated with receipt of the fourth message; and
    transmitting the fifth time stamp and the eighth time stamp to the first device.

* * * * *